United States Patent [19]

Bartoletto

[11] 4,100,729
[45] Jul. 18, 1978

[54] CHAIN SHACKLE

[76] Inventor: Avellino J. Bartoletto, 25460 Novi Rd., Novi, Mich. 48050

[21] Appl. No.: 814,441

[22] Filed: Jul. 11, 1977

[51] Int. Cl.² ............................................. F16G 15/02
[52] U.S. Cl. ......................................... 59/86; 403/274
[58] Field of Search ................... 59/86, 93, 85, 84, 87; 294/78, 82 R; 403/274, 284

[56] References Cited

U.S. PATENT DOCUMENTS

| 2,017,362 | 10/1935 | Werder | 403/274 |
|---|---|---|---|
| 2,259,880 | 10/1941 | Ehmann | 59/86 |
| 3,656,293 | 4/1972 | Lowery | 59/86 |
| 3,958,411 | 5/1976 | Bernt | 59/86 |

Primary Examiner—Carl E. Hall
Assistant Examiner—Gene P. Crosby
Attorney, Agent, or Firm—Barnes, Kisselle, Raisch & Choate

[57] ABSTRACT

A chain shackle has a pin thereon for mounting the shackle on a hanger. The pin extends across the ears of the shackle and is permanently connected thereby by flaring a pair of fingers at one end of the pin into enlarged pockets formed in the bore of the ear through which the pin passes.

18 Claims, 5 Drawing Figures

CHAIN SHACKLE

This invention relates to a chain shackle, and, more specifically, to a shackle for connecting a chain to a hanger on the inside of a cement kiln.

Chain shackles employed in rotating cement kilns are subjected not only to relatively high temperatures, but also to relatively severe and abusive use. It is important that such shackles are designed to withstand such use over relatively long periods of time since the operation of replacing them from time to time is a costly one. Accordingly, it is important that the connection between the shackle and the pin used for attaching the shackle to a hanger within the kiln is reliably secure. Furthermore, it is important that the shacklepin assembly involve a minimum of parts which can be securely assembled together in a simple and effective manner and which is also capable of disassembly in a simple manner when required.

Accordingly, it is an object of this invention to provide a shackle and pin for securing the shackle to a hanger which are designed for easy, but very effective, interconnection.

Another object of the present invention is to provide a shackle and pin assembly designed so that they can be permanently secured together without additional parts and by means of a simple tool.

More specifically, the invention contemplates a shackle having a U-shaped body portion provided with spaced ears formed with aligned bores for the reception of a shackle pin. At one end the pin has axially extending fingers thereon which can be spread apart by bending them with a flaring tool after the pin is inserted into the aligned bores. The bore in one of the shackle ears is undercut to receive the flared fingers on the end of the pin so as to prevent withdrawal of the pin from within the ears of the shackle. Preferably the pin and the shackle are designed so that they are not rotatable relative to one another.

Other objects, features and advantages of the present invention will become apparent from the following description and accompanying drawing, in which.

Figure 1:
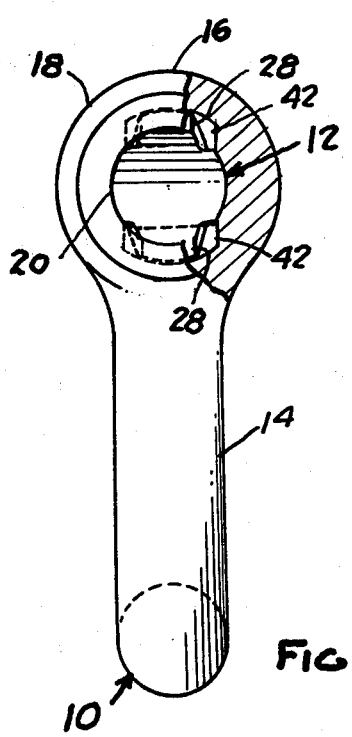
FIG. 1 is an end view, with parts broken away, of an assembled pin and shackle according to the present invention.

The shackle of the present invention is generally designated 10 and the pin is designated 12. The shackle 10 comprises a generally U-shaped body portion 14, the legs of which terminate in a pair of opposed ears 16,18. Ears 16,18 are formed with axially aligned bores 20,22. Pin 12 extends through these bores and through a hanger 24 which is illustrated in broken lines in FIG. 2.

Figure 2:
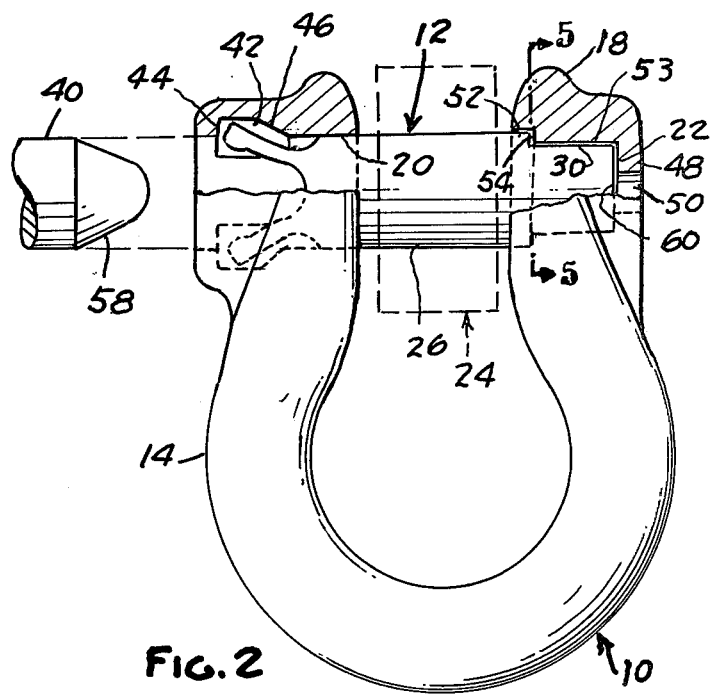
FIG. 2 is a side elevational view, with parts broken away, of the shackle and pin assembly of this invention.
Figure 3:
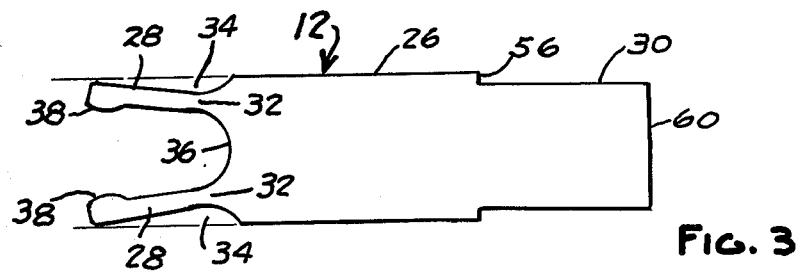
FIG. 3 is a view of the shackle pin prior to its assembly with the shackle.
Figure 4:
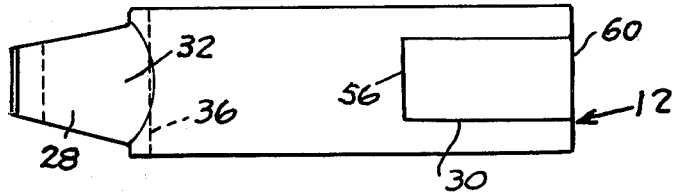
FIG. 4 is a view similar to FIG. 3, the pin having been rotated 90°.

As shown in FIG. 3, pin 12 has a circular cylindrical body portion 26. A pair of fingers 28 project axially from one end of body portion 26. At its opposite end the pin 12 is formed with a pair of diametrically opposite flattened portions 30. Fingers 28 in their initial condition flare outwardly away from each other as shown in FIG. 3 and the junctions 32 between each finger and body portion 26 are defined on their radially outer sides by an arcuate recess 34 at diametrically opposite sides of the pin. At the inner sides thereof junctions 32 are defined by a generally circular cylindrical surface 36. Recesses 34 and 36 are so designed that each finger 28 has a minimum thickness at the junction 32. At their free ends fingers 28 are formed with inwardly projecting enlarged portions 38. As viewed in plan, each finger 28 tapers in width toward its free end so that it is widest at the junctions 32. The design of the fingers in conjunction with the design of their junctions 32 with the body portion 26 of the pin is such that when a flaring tool, such as illustrated at 40 in FIG. 2, is driven axially inwardly between the fingers they are constrained to bend outwardly at the junctions 32.

Figure 5:
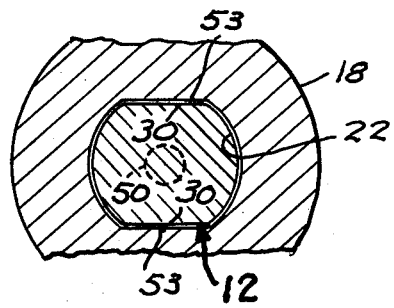
FIG. 5 is a sectional view along the line 5—5 in FIG. 2.

Referring again to FIG. 2, the bore 20 is a circular cylindrical bore having a diameter only slightly larger than the diameter of the body portion 26 of the pin. Intermediate its ends, bore 20 is radially enlarged at diametrically opposite sections thereof to form a pair of pockets 42 for accommodating fingers 28 when the latter are spread apart, as by forcing the flaring tool 40 axially therebetween. Pockets 42 are preferably formed with abrupt shoulders 44 adjacent the axially outer end of bore 20. The axially opposite ends of the pockets 42 may be defined by a less steeply inclined shoulder 46. The other bore 22 terminates in an end wall 48 at the axially outer end of the bore. Wall 48 is provided with a central aperture 50 therein. At the axially inner end thereof bore 22 comprises a circular cylindrical bore portion 52 having a diameter only slightly greater than the diameter of the body portion 26 of the pin 12 so as to receive the same with a slip fit. Between cylindrical bore portion 52 and end wall 48 bore 22 has diametrically opposite flat portions 53 which form radially inwardly extending shoulders 54 at one end of bore portion 52. The portion of bore 22 between shoulders 54 and end wall 48 conform generally in size and shape with the cross section of the pin at the portion thereof provided with the flat sections 30. This is illustrated in FIG. 5.

In assembling shackle 10 to hanger 24 the shackle is positioned with the ears 16,18 straddling the hanger. Thereafter, pin 12 is inserted through the bore 20, through an opening in hanger 24 and into bore 22 of ear 18. The length of pin 12 is such that, when assembled with the shackle, its opposite ends terminate axially inwardly of the outer lateral faces of ears 16,18. Pin 12 is preferably inserted into the two bores on the shackle ears so that the shoulders 56 on the pin abut against the shoulders 54 in bore 22. Thereafter, the flaring tool 40 is inserted through the open end of bore 22 with its chamfered end 58 engaged between the free ends of fingers 28. Although a specially designed flaring tool 40 is illustrated, as a practical matter, any suitably sized bolt with a chamfered end can be used as a flaring tool. As the flaring tool is driven axially inwardly fingers 28 are bent radially outwardly about their junctions 32 with the body portion of the pin and into pockets 42. Fingers 28 are fully expanded when the free ends thereof become seated within pockets 42 behind shoulders 44. This effectively locks the pin 12 against axial displacement out of the bores 20,22 in either direction. As viewed in FIG. 2, pin 12 is prevented from being displaced axially out of the ears of the shackle in a direction toward the left by the interengagement of the free ends of fingers 28 with shoulders 44. The pin is prevented from being displaced axially out of the ears of the shackle in a direction toward the right by the abutment of the free end face 60 of the pin with the end wall 48.

It will be observed that after the pin is assembled to the shackle it is prevented from rotating relative thereto. This is the preferred construction since it tends to eliminate excessive wear between the pin and the shackle. It will also be noted that the portion of the pin extending between ears 16,18 is a perfectly cylindrical surface with no undercuts. This also contributes to the long life of the assembled shackle. In the event that it does become necessary to remove the shackle from hanger 24, this can be accomplished simply by cutting through the pin on opposite sides of the hanger with a torch so as to remove the shackle from the hanger. Thereafter, the one remaining portion of the pin can be driven out of bore 22 by means of a punch driven through opening 50. The other portion of the pin can be driven out of bore 20 by means of a small diameter punch driven against the surface 36. In this connection, the tapered faces 46 of pockets 42 will assist in allowing the fingers 28 to bend inwardly toward one another so as to clear the diameter of bore 20.

I claim:

1. In combination, a shackle having a generally U-shaped body portion terminating in a pair of laterlly space opposed ears, each ear having a bore therein axially aligned with the bore in the other ear, at least one of said bores extending completely through its respective ear, said one bore being radially enlarged at an axial portion thereof intermediate its ends, a pin extending through said one bore and into the other bore, said pin having a pair of generally axially extending fingers at the end thereof disposed within said one bore, said fingers being flared radially outwardly into said enlarged bore portion to thereby lock the pin axially on the shackle.

2. The combination set forth in claim 1 wherein said fingers extend from the end of said pin axially in a direction toward the laterally outer face of the ear in which said one bore is formed so that the fingers can be displaced to said flared condition by means of a flaring tool inserted axially into said one bore and between said fingers from said laterally outer face of said ear.

3. The combination set forth in claim 2 including interengaged shoulder means on said pin and shackle for preventing rotation between the pin and shackle.

4. The combination set forth in claim 2 wherein said enlarged bore portion is defined at the end thereof adjacent the laterally inner face of its respective ear by a surface which is inclined radially inwardly in a direction toward said laterally inner face.

5. The combination set forth in claim 2 including means interengaging said pin and shackle to limit the extent to which said pin can be inserted into said aligned bores and thereby prevent axial displacement of said pin when the fingers are flared outwardly by the force applied thereto by said flaring tool.

6. The combination set forth in claim 3 wherein the free ends of said fingers and the opposite end of said pin terminate axially inwardly of the laterally outer faces of said ears.

7. The combination set forth in claim 2 wherein the junction between each finger and the pin is defined on the radially outer side thereof by a radially inwardly recessed portion on the outer surface of the pin.

8. The combination set forth in claim 5 wherein said junction on the radially inner side thereof is defined by an arcuately curved surface.

9. The combination set forth in claim 2 wherein the thickness of each finger at its junction with said pin is less than the thickness of the remaining portion of the finger to assure bending of the finger at the junction when the flaring tool is driven axially between the fingers.

10. The combination set forth in claim 7 wherein said fingers have their maximum thickness at the free ends thereof.

11. The combination set forth in claim 7 wherein the fingers are of maximum width at said junctions with said pin.

12. The combination set forth in claim 2 wherein the end of the pin remote from said fingers has a noncircular cross section and said other bore has a cross section generally corresponding thereto to prevent rotation of the pin relative to the shackle.

13. The combination set forth in claim 11 wherein said radially enlarged portion of said one bore comprises a pair of diametrically opposite pockets in which said flared fingers are seated.

14. The combination set forth in claim 11 wherein said pin has a radially outwardly extending shoulder thereon adjacent said last-mentioned end of the pin and said shackle has a radial shoulder thereon in axially abutting relation with the shoulder on the pin.

15. The combination set forth in claim 13 wherein said shoulders are disposed axially between the ends of said other bore.

16. The combination set forth in claim 2 wherein the confronting ends of said bores are of substantially the same diameter and the portion of the pin extending between and into said confronting ends of said portion is of a generally uniform diameter slightly less than that of the confronting ends of said bores.

17. The combination set forth in claim 15 wherein said other bore terminates in an end wall at the laterally outer face of its respective ear.

18. The combination set forth in claim 16 wherein said end wall has a central aperture therein.

* * * * *

UNITED STATES PATENT AND TRADEMARK OFFICE
CERTIFICATE OF CORRECTION

PATENT NO. : 4,100,729
DATED : JULY 18, 1978
INVENTOR(S) : Avellino J. BARTOLETTO It is certified that error appears in the above-identified patent and that said Letters Patent are hereby corrected as shown below:

Column 3, Line 26   Cancel "laterlly" and insert -- laterally --

Column 4, Line 5    Cancel "3" and insert -- 5 --

Column 4, Line 12   Cancel "5" and insert -- 7 --

Column 4, Line 21   Cancel "7" and insert -- 9 --

Column 4, Line 24   Cancel "7" and insert -- 9 --

Column 4, Line 32   Cancel "11" and insert -- 12 --

Column 4, Line 36   Cancel "11" and insert -- 12 --

Column 4, Line 41   Cancel "13" and insert -- 14 --

Column 4, Line 50   Cancel "15" and insert -- 16 --

Column 4, Line 53   Cancel "16" and insert -- 17 --

Signed and Sealed this

Twentieth Day of February 1979

[SEAL]

Attest:

RUTH C. MASON
*Attesting Officer*

DONALD W. BANNER
*Commissioner of Patents and Trademarks*